Sept. 28, 1943.  H. SCHUTZ  2,330,522
CHASSIS TRUSS BAR
Filed Aug. 22, 1941
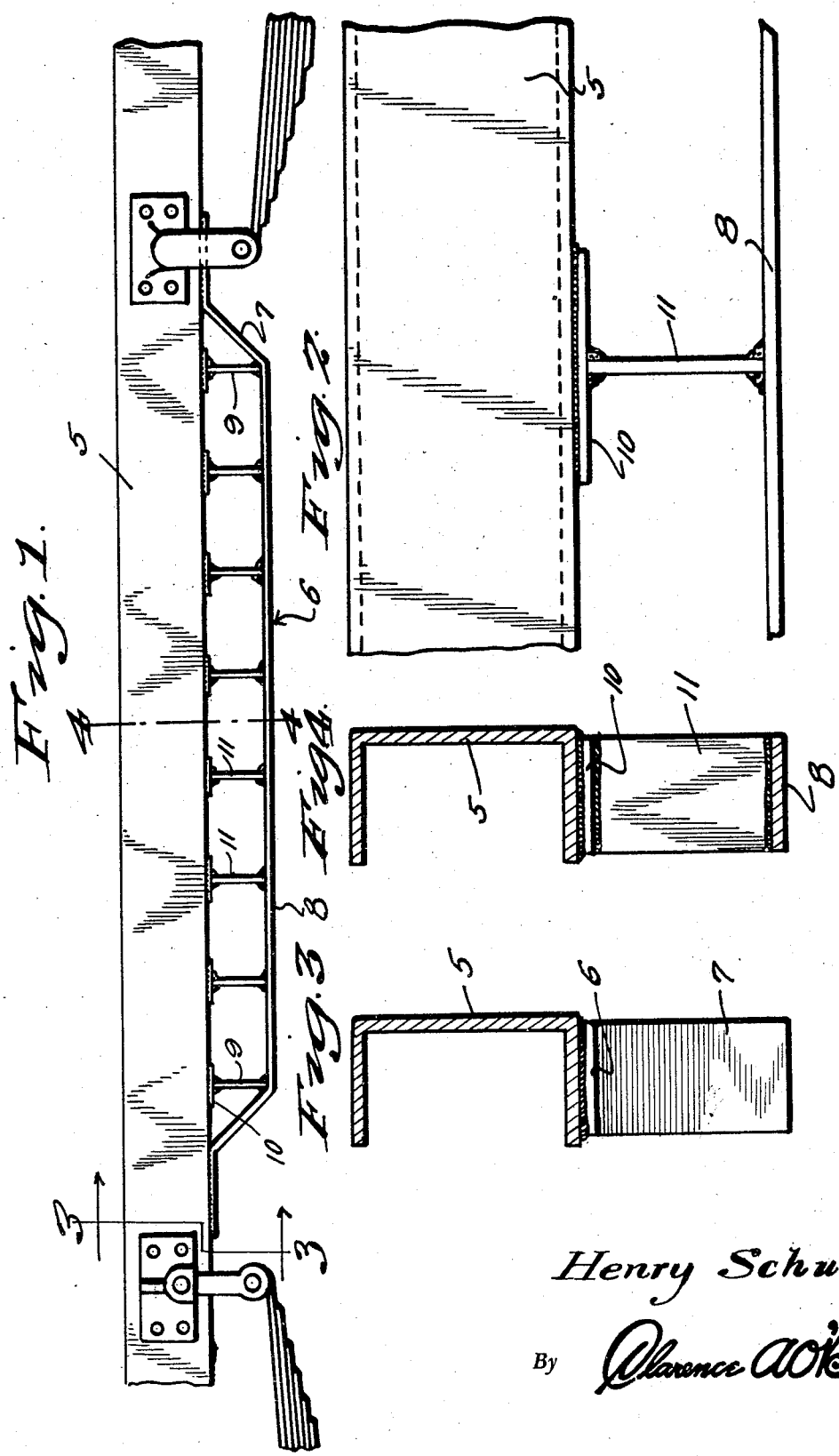
Inventor
*Henry Schutz*
By *Clarence A. O'Brien*
Attorney Patented Sept. 28, 1943

2,330,522

UNITED STATES PATENT OFFICE 2,330,522

CHASSIS TRUSS BAR

Henry Schutz, Margate City, N. J.

Application August 22, 1941, Serial No. 407,969

2 Claims. (Cl. 280—106)

The present invention relates to new and useful improvements in truss units for the chassis of a vehicle to reinforce the same and provide additional strength thereto.

An important object of the invention is to provide a truss of this character that is permanently secured in position and which does not interfere with any of the usual parts of the vehicle normally attached to the chassis.

A further object is to provide a truss which is welded to the under side of any of the frame members of the chassis and which embodies simplicity of construction and at the same time is strong and durable and relatively inexpensive to manufacture and install in position.

Other objects and advantages reside in the details of construction and operation as more fully hereinafter described and claimed, reference being had to the accompanying drawing forming part hereof, wherein like numerals refer to like parts throughout, and in which:

Figure 1 is a side elevational view of a vehicle frame member showing the truss in position thereon.

Figure 2 is an enlarged fragmentary side elevational view and

Figures 3 and 4 are transverse sectional views taken respectively on the lines 3—3 and 4—4 of Figure 1.

Referring now to the drawing in detail the numeral 5 designates one of the longitudinal frame members of a vehicle chassis, and which may be of channel form, tubular or other construction, having a flat truss bar 6 welded at its ends to the frame member. The bar 6 is provided adjacent each welded end with an inclined portion 7 spacing the intermediate portion 8 of the bar from the frame member and in parallelism thereto.

At the junction of the inclined portions 7 with the intermediate portion 8 is positioned a support 9 of flat metal having its lower end welded to the truss bar and interposed between the top of the support and the truss bar is a flat plate 10 which is welded around its edges to the frame member and also welded to the upper end of the support. The support 9 and plate 10 form a substantially T-shaped brace between the truss bar and the frame member.

Similar T-shaped braces 11 are welded in position at predetermined spaced intervals along the entire length of the intermediate portion of the truss bar.

It will be understood the truss unit thus formed may also be attached to the transverse frame members or other frame members of the chassis.

Having thus described my invention, what is claimed as new is:

1. A truss for a chassis frame member and comprising a flat truss bar having its ends welded to the under side of the frame member, said bar adjacent its ends being inclined away from the frame member to space the intermediate portion of the bar in parallelism thereto, and T-shaped supports of a width equal to the width of the bar and having their bottom portions welded to the bar and their top portions welded to the frame member.

2. A truss for a chassis frame member and comprising a flat truss bar having its ends welded to the under side of the frame member, said bar adjacent its ends being inclined away from the frame member to space the intermediate portion of the bar in parallelism thereto, upright supports having their lower ends welded to the bar, and cross plates welded to the top of the supports and to the under side of the frame member, said supports and cross plates being of uniform width and said supports being of a width to extend transversely of the bar from edge to edge thereof for bracing the entire width of the bar, and said cross plates being substantially equal to the width of the frame member to brace the entire transverse area thereof.

HENRY SCHUTZ.